March 14, 1944. G. WISE Re. 22,456

CABINET

Original Filed Sept. 13, 1941

INVENTOR,

George Wise

BY

Victor J. Evans & Co.

ATTORNEYS

Reissued Mar. 14, 1944

Re. 22,456

UNITED STATES PATENT OFFICE 22,456

CABINET

George Wise, Brooklyn, N. Y.

Original No. 2,297,995, dated October 6, 1942, Serial No. 410,742, September 13, 1941. Application for reissue September 21, 1943, Serial No. 503,301

12 Claims. (Cl. 312—175)

This invention relates to a shaving cabinet adapted to be mounted on or recessed in the wall of the bathroom below or at one side of the medicine cabinet.

My invention has for one of its objects to provide a device of the character stated which will include a shaving kit, and kit-carrying means mounted for movement into or out of the cabinet, said means being adapted to be supported by the cabinet door when outside of the cabinet.

My invention has for a further object to provide a device of the character stated wherein the kit and the kit-carrying means will be so constructed as to permit the use of a comparatively shallow cabinet and thus enable the cabinet to be recessed into a comparatively thin wall or partition.

A further object of my invention is to provide a device of the character stated wherein the kit-carrying means will embody a member of substantially inverted U-form provided at its ends with means for supporting it for free movement into or out of the cabinet, and wherein the kit will be mounted on its carrying means for movement into a horizontal or vertical position, the kit being located at right angles with relation to its carrying means when in horizontal position and being arranged in the plane in which the carrying means is located when in vertical position.

A still further object of my invention is to provide a device of the character stated wherein the kit may be easily and quickly opened and moved into its horizontal position and wherein the opened kit will be supported against turning movement by its carrying means when in such position.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
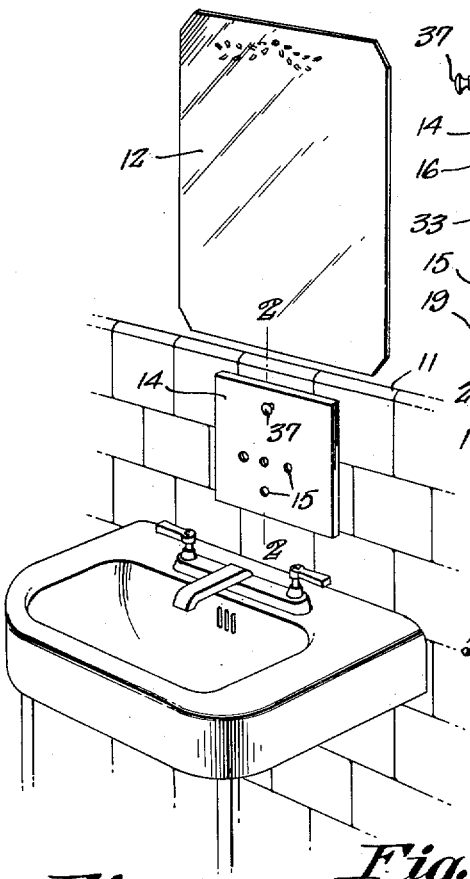
Figure 1 is a perspective view showing a shaving cabinet constructed in accordance with the invention recessed in the wall of a bathroom below the medicine cabinet.

Referring now to the drawing in which like characters of reference designate similar parts in the various views, 10 designates a shallow rectangular cabinet adapted to be recessed into the wall 11 of a bathroom at one side of or below the medicine cabinet 12, or to be mounted on the wall, there being openings 13 formed in the back of the cabinet to receive screws or other connectors. The cabinet is provided with a door 14 having ventilating and drain openings 15 therein and having a sheet 16 of pasteboard on its inner face to support a razor or other accessory when the door is opened to form a shelf.

Track rails 17 are mounted on the inner face of the door and extend along the bottom 18 of the cabinet. The track rails are each provided with hinges 19 which constitute the door hinges. It will be pointed out that when the door is closed an open space 20 exists between the bottom of the door and the cabinet, see Figure 2, to ventilate the cabinet as well as to dry out a shaving brush 21 which is supported by a spring clip 22 on one of the legs 23 of an inverted U-shaped kit carrier 24, see Figure 6.

The inverted U-shaped kit carrier 24 is provided on the bottom of each leg with an integral guide 25 which slidably receives a respective track rail 17 so that the kit-carrier is mounted for movement into or out of the cabinet and is supported by the cabinet door when outside of the cabinet.

A conventional shaving kit 26 is mounted on the kit-carrier 24. The kit is of the so called book type comprising two hollow covers 27 hingedly connected together and provided with slide fasteners 28.

Figure 4:
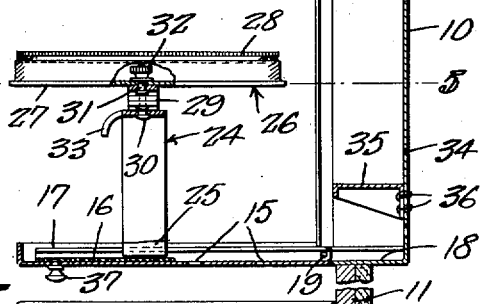
Figure 4 is a vertical sectional view of the shaving cabinet showing the shaving kit carrying means moved out of the cabinet.
Figure 5:
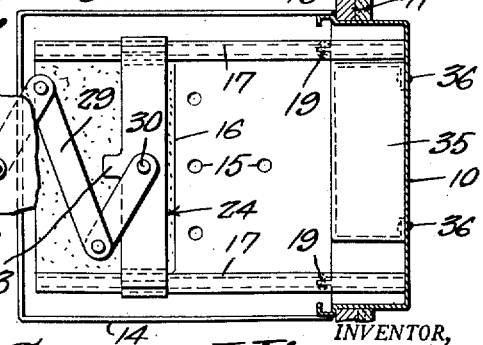
Figure 5 is a cross sectional view taken on the line 5—5 of Figure 4.

The kit is secured to the kit-carrier 24 through the medium of nested links 29 pivotally connected together, one of the links being pivotally connected to the horizontal portion of the kit-carrier by a pivot pin 30 and the other terminal link being pivotally connected to the kit 26 by a pivot pin 31 which is equipped with a nut 32, see Figure 4, to permit detachment of the kit when it is desired to pack in a traveling bag when traveling.

Figure 3:
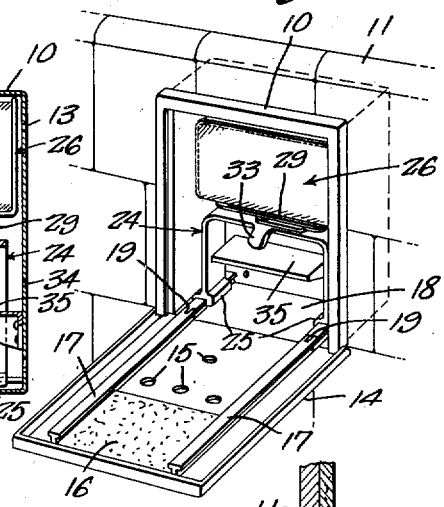
Figure 3 is a perspective view of the shaving cabinet showing the door open and forming a shelf.

It can now be seen that the kit is mounted from movement on the kit-carrier into a horizontal position, see Figure 4, or into a vertical position, see Figure 3. The kit is located at right angles with relation to the kit-carrier when in horizontal position and is arranged in the plane in which the kit-carrier is located when in vertical position.

Figure 2:
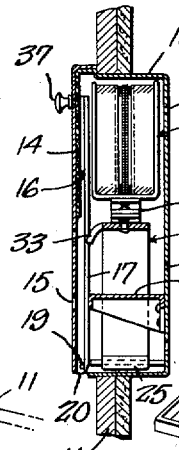
Figure 2 is a longitudinal sectional view of the shaving cabinet taken on the line 2—2 of Figure 1.

The kit-carrier is provided with a finger grip 33, see Figures 2 and 3, by means of which the kit-carrier may be moved out of the cabinet to the operative position shown in Figure 4, and it will be pointed out that the nut 32 supports the kit against turning movement when in such position.

Figure 6:
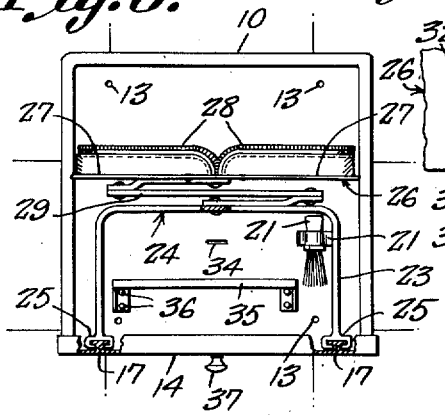
Figure 6 is a front elevation of the cabinet shown in Figure 4 with the track shown in section.

The back wall of the cabinet is provided with a slot 34, see Figure 6, into which used razor blades may be thrust to be discarded into the wall of the bathroom as is customary.

A shelf 35 is secured to the back wall of the cabinet by rivets 36 or other connectors and may be used to support various other toilet accessories.

When the kit-carrier is drawn out of the casing on to the open door it can be seen that the nested links 29 may be swung forwardly or at various lateral angular positions to conveniently locate the kit in horizontal position for use.

For opening and closing the cabinet door 14 a knob 37 is secured to the front face of the door near the top of the door, see Figure 2.

Since the operation of the parts have been described as the description of the parts progressed it is thought that the invention will be fully understood without further explanation.

What is claimed is:

1. A shaving cabinet having a door hinged at the bottom to the cabinet, a track on the door extending along the bottom of the cabinet, and an inverted U-shaped kit-carrying member provided at its ends with means for supporting the member on the track for free movement into or out of the cabinet.

2. The structure as of claim 1 and in which said means comprises guides slidably receiving track rails.

3. The combination with a shaving cabinet having a door hinged at the bottom thereto, of an inverted U-shaped member slidably mounted at the lower ends of its legs on the inner face of the door and adapted to be supported by the door when open to move into or out of the cabinet, a shaving kit having two hollow covers hingedly connected together and closed by slide fasteners, nested levers pivotally connected together, the terminal levers of the nested levers being connected respectively to the member and to the kit, said member and said levers mounting the kit for movement on the kit-carrier into a vertical position or a horizontal position, the kit being located at right angles to the kit-carrier when in horizontal position and being arranged in the plane in which the kit-carrier is located when in vertical position.

4. The combination with a shaving cabinet of a door closing the front of the cabinet, track rails on the inner face of the door extending along the top face of the bottom of the cabinet, hinge joints in the track rail hingedly mounting the door at the bottom on the cabinet, an inverted U-shaped kit-carrier having guides on the lower ends of its legs slidably embracing the track rails and adapted to be moved into the cabinet and to be moved out of the cabinet on the track rails when the door is rocked to horizontal open position to form a shelf, a book type shaving kit, and a pivot pin having a nut detachably connecting the kit to the kit-carrier and preventing turning movement of the kit on the kit-carrier when in operative position for use.

5. A cabinet, comprising a rectangular housing, a door for the housing pivoted at its lower end, a track in the bottom of the housing, a track carried by the inner face of the door and forming a continuation of the track in the housing when the door is swung downwardly, an inverted U-shaped member slidably mounted at the lower ends of its legs on the tracks, and a kit mounted on the upper end of the inverted U-shaped member and adapted to be extended beyond the same.

6. A cabinet, comprising a rectangular housing, a door for the housing pivoted at its lower end, a track in the bottom of the housing, a track carried by the inner face of the door and forming a continuation of the track in the housing when the door is swung downwardly, an inverted U-shaped member slidably mounted at the lower ends of its legs on the tracks, and a nested series of levers pivoted to the upper end of the inverted U-shaped member and having a kit pivotally connected thereto.

7. A cabinet having closure means hinged at its bottom to the cabinet, a track on the bottom of said cabinet and a track on the closure means constituting an extension of the track on the bottom of the cabinet, and a book-type kit having mounting means at its hinged edge movable on said track and said extension thereof, the kit being movable on said mounting means to occupy a vertical position in its closed condition and to form a shelf of ready access in its open condition when moved onto said closure means when the closure means is in a shelf-forming position.

8. A cabinet having closure means hinged at its bottom to the cabinet, a track on the bottom of said cabinet and a track on the closure means constituting an extension of the track on the bottom of the cabinet, mounting means movable on said tracks, and a book-type kit mounted on said last means and movable thereon to occupy a vertical closed positioned within the cabinet and an open position to form a shelf for ready access when said mounting means is moved onto said closure means and said closure means is in a shelf-forming position.

9. A cabinet having closure means hinged at its bottom to the cabinet, a track on the bottom of said cabinet and a track on the closure means constituting an extension of the track on the bottom of the cabinet, and a shaving kit having means whereby the same is movably mounted on said tracks and comprising sections hinged to move to a vertical position within the cabinet and to a position of ready access in its open condition when moved out of said cabinet onto said closure means when the closure means is in a shelf-forming position.

10. The combination with a cabinet having closure means hinged at its bottom to the cabinet, of a track on the bottom of said cabinet and a track on the closure means constituting an extension of the track on the bottom of the cabinet, mounting means movable on said tracks, and a book-type shaving kit mounted on said mounting means and movable on the track with respect to the cabinet to occupy a vertical closed position when moved on the track into the cabinet and to occupy an open position of ready access outside of the opened cabinet when moved on the track onto said closure means when the closure means is moved into a shelf-forming position.

11. The combination of a cabinet with a book-type kit, means movably mounting said kit on the cabinet, said means including links pivotally connected together for moving the kit in and out of the cabinet with the terminal links of said links being connected respectively to the hinged edge of the book-type kit and to the cabinet, and means whereby said kit is movable with respect to its mounting means to occupy a vertical position in its closed condition within the cabinet and to form a shelf of ready access in its open condition when moved outside of said cabinet.

12. The combination with a cabinet having closure means hinged at its bottom to the cabinet, of a shaving kit, means movably mounting said kit on the cabinet including links pivotally connected together for moving the kit in and out of the cabinet with the terminal links of said links being connected respectively to the kit and to the cabinet, said kit comprising hinged sections whereby said kit may be moved with respect to said links to occupy a vertical closed position in its unused condition within the cabinet and an open position of ready access when said kit is moved outside of said cabinet and when said closure means is moved into a shelf-forming position.

GEORGE WISE.